United States Patent
Tang et al.

(10) Patent No.: US 10,140,368 B2
(45) Date of Patent: Nov. 27, 2018

(54) METHOD AND APPARATUS FOR GENERATING A RECOMMENDATION PAGE

(71) Applicant: Baidu Online Network Technology (Beijing) Co., LTD., Beijing (CN)

(72) Inventors: Zhenjiang Tang, Beijing (CN); Naiqiang Chu, Beijing (CN); Lisheng Duan, Beijing (CN); Xuesheng Gong, Shanghai (CN); Jie Li, Beijing (CN); Cong Wang, Beijing (CN)

(73) Assignee: Baidu Online Network Technology (Beijing) Co., LTD., Beijing (CN)

( * ) Notice: Subject to any disclaimer, the term of this patent is extended or adjusted under 35 U.S.C. 154(b) by 344 days.

(21) Appl. No.: 14/588,004

(22) Filed: Dec. 31, 2014

(65) Prior Publication Data
US 2015/0278359 A1    Oct. 1, 2015

(30) Foreign Application Priority Data

Mar. 28, 2014    (CN) .......................... 2014 1 0122939

(51) Int. Cl.
G06F 17/30        (2006.01)
H04L 29/08        (2006.01)

(52) U.S. Cl.
CPC ........ *G06F 17/30864* (2013.01); *H04L 67/02* (2013.01)

(58) Field of Classification Search
None
See application file for complete search history.

(56) References Cited

U.S. PATENT DOCUMENTS

2009/0172551 A1    7/2009 Kane et al.
2009/0240683 A1*   9/2009 Lazier ............... G06F 17/30864
2011/0276558 A1*   11/2011 Garg ................. G06F 17/30448
                                                                  707/706

(Continued)

FOREIGN PATENT DOCUMENTS

AU    2008319008 B2    9/2012
CN      103279492 A    9/2013

(Continued)

OTHER PUBLICATIONS

The First Search Report for CN2014101229395 dated Aug. 9, 2016, 4 pages.

(Continued)

*Primary Examiner* — Alex Gofman
(74) *Attorney, Agent, or Firm* — Nixon Peabody LLP

(57) ABSTRACT

A method for generating a recommendation page includes determining, when a user accesses a webpage, a keyword set keyword from among one or more to-be-exhibited keywords, exhibiting the set in an accessed webpage, obtaining the user's selection on the keyword set so as to determine chosen keywords selected by the user based on said user's selection, and generating a recommendation page corresponding to the chosen keywords for display to the user. The recommendation page contains at least one piece of keyword recommendation information associated with said chosen keywords. The keyword set has one or more user keywords corresponding to the user.

17 Claims, 2 Drawing Sheets

(56) References Cited

U.S. PATENT DOCUMENTS

Figure 1:
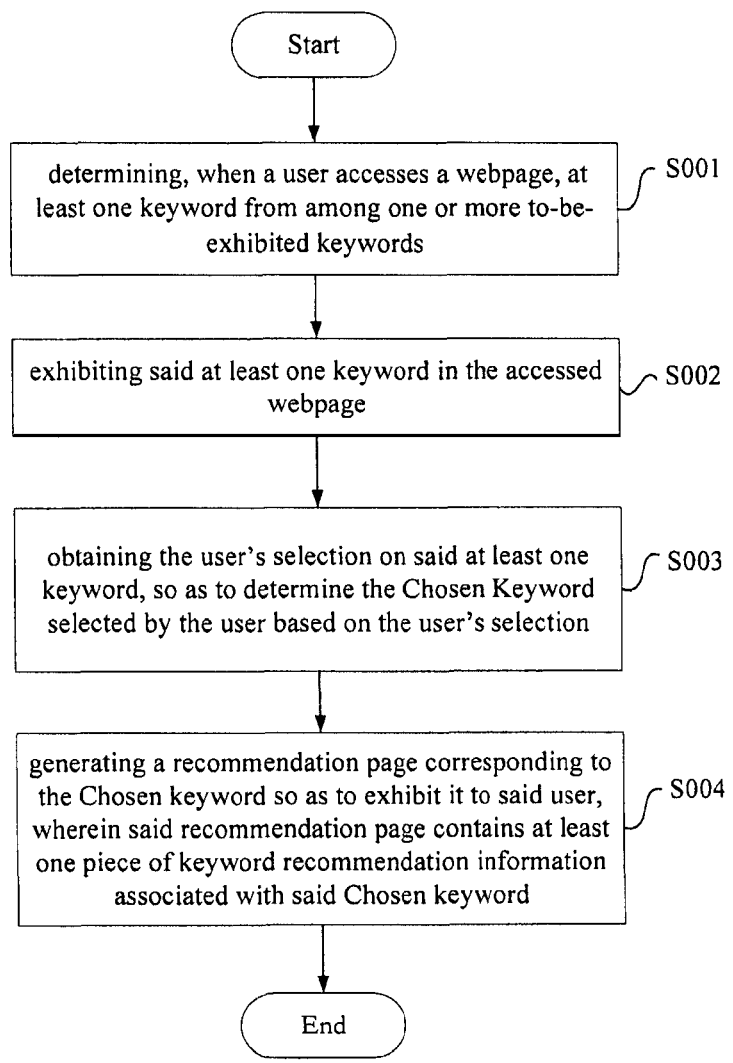

| | | | |
|---|---|---|---|
| 2012/0271819 A1* | 10/2012 | Qiu | G06Q 30/02 707/723 |
| 2012/0297286 A1 | 11/2012 | Nagahama | |
| 2013/0110863 A1* | 5/2013 | Lai | G06F 17/30967 707/767 |
| 2013/0185654 A1* | 7/2013 | Harris | H04W 4/21 715/753 |

FOREIGN PATENT DOCUMENTS

| | | |
|---|---|---|
| CN | 103324631 A | 9/2013 |
| CN | 103425670 A | 12/2013 |
| CN | 103577392 A | 2/2014 |
| KR | 20090001736 A | 1/2009 |

OTHER PUBLICATIONS

The First Office Action for CN2014101229395 dated Aug. 19, 2016, 15 pages.

The Second Office Acton for CN2014101229395 dated Jan. 18, 2017, 20 pages.

\* cited by examiner

METHOD AND APPARATUS FOR GENERATING A RECOMMENDATION PAGE

RELATED APPLICATIONS

This application claims the benefit of the Mar. 28, 2014 priority date of Chinese application CN201410122939.5, the contents of which are herein incorporated by reference.

FIELD OF THE INVENTION

The present invention relates to recommendation, and and more specifically to generating a recommendation page.

BACKGROUND

In the prior art, when recommended keywords are displayed to a user in a webpage, the recommended keywords are always generated only based on the contents of the page or website. The range of recommended keywords is therefore not very broad. Many times, the user cannot find keywords of interest, except those from the webpage contents, from among the exhibited keywords.

Moreover, according to the solutions in the prior art, after a user selects the keywords, when exhibiting the recommended information thereto, the recommended information related to the user preference is not obtained through analyzing the user's network usage records, such that the exhibited recommended information cannot fully cover the user demands.

SUMMARY

An objective of the present invention is providing a method for generating a recommendation page, wherein said method comprises:

a. when a user accesses a webpage, determining at least one keyword from among one or more to-be-exhibited keywords, wherein said at least one keywords include one or more user keywords corresponding to the user;

b. exhibiting said at least one keyword in the accessed webpage;

c. obtaining the user's selection operation on said at least one keyword, so as to determine the chosen keyword(s) selected by the user based on the user's selection operation;

d. generating a recommendation page corresponding to the chosen keyword(s) so as to exhibit it to said user, wherein said recommendation page contains at least one piece of keyword recommendation information associated with said chosen keyword(s).

According to one aspect of the present invention, there is further provided a page generating apparatus for generating a recommendation page, wherein said page generating apparatus comprises:

a first determining device configured to, when a user accesses a webpage, determine at least one keyword from among one or more to-be-exhibited keywords, wherein said at least one keywords include one or more user keywords corresponding to the user;

an exhibiting device configured to exhibit said at least one keyword in the accessed webpage;

a first obtaining device configured to obtain the user's selection operation on said at least one keyword, so as to determine the chosen keyword(s) selected by the user based on the user's selection operation;

a generating device configured to generate a recommendation page corresponding to the chosen keyword(s) so as to exhibit it to said user, wherein said recommendation page contains at least one piece of keyword recommendation information associated with the chosen keyword(s).

Compared with the prior art, the present invention has the following advantages: 1) obtaining keywords representing user interest and representing the content of the webpage through analyzing the user's network using record and the accessed webpage, so as to exhibit the determined keywords to the user in the webpage, such that the user can look up keywords of a plurality of sources in the accessed page, thereby enhancing the precision of the keywords recommended to the user, such that the recommended keywords more satisfy the user's needs; 2) obtaining recommended information more conformant with the user's needs based on the keywords selected by the user in conjunction with the user's network usage records; 3) moreover, by further combining the current hot information, e.g., hot query words in a search engine, further enriching the keywords and the recommended information content that can be provided, so as to more fully cover the user needs.

BRIEF DESCRIPTION OF THE ACCOMPANYING DRAWINGS

Figure 2:
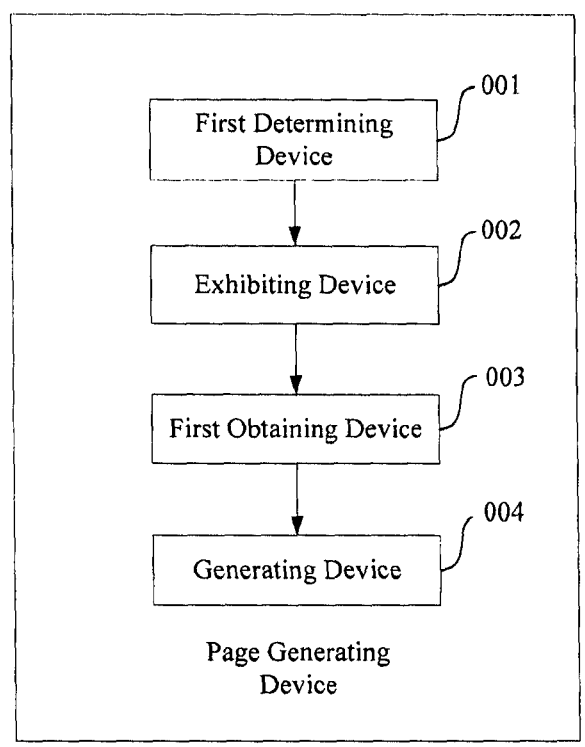

Other features, objectives and advantages of the present invention will become more apparent through reading the detailed description of the non-limiting embodiments with reference to the following drawings:

FIG. 1 schematically shows a flow diagram of a method for generating a recommendation page according to the present invention;

FIG. 2 schematically shows a structural diagram of a page generating apparatus for generating a recommendation page according to the present invention;

The same or similar reference numerals in the accompanying drawings represent the same or similar components.

DETAILED DESCRIPTION OF THE PREFERRED EMBODIMENTS

Hereinafter, the present invention will be described further in detail with reference to the accompanying drawings.

FIG. 1 schematically shows a flow diagram of a method for generating a recommendation page according to the present invention. The method according to the present invention comprises step S001, step S002, step S003, and step S004.

Herein, the method according to the present invention is implemented through a page generating apparatus included in a computer device. The computer device comprises an electronic device capable of automatically performing numerical value computation and/or information processing according to a pre-set or pre-stored instruction, whose hardware includes, but is not limited to, a microprocessor, an application-specific integrated circuit (ASIC), a programmable gate array (FPGA), a digital processor (DSP), an embedded device, etc. The computer device includes a network device and/or a user equipment, wherein the network device includes, but is not limited to, a single network server, a server group composed of a plurality of network servers, or a cloud composed of a considerable number of host machines or network servers based on cloud computing, wherein the cloud computing is a kind of distributed computing, which is a super virtual computer composed of a group of loosely coupled computer sets. The user equipment includes, but is not limited to, any kind of electronic product that may perform human-machine interaction with a user through a keyboard, a mouse, a remote controller, a touch panel, or an acoustical control device, and the like, e.g., a personal computer, a tablet computer, a smart phone, a PDA, a game machine, or IPTV, etc. Herein, the network where the user equipment and the network device are located includes, but is not limited to, the Internet, a wide area network, an urban area network, a local area network, and a VPN network, etc.

Preferably, the computer device according to the present invention comprises the network device.

It should be noted that the user equipment, network device, and network are only examples, and other existing or future possibly developed user equipment, network devices, and networks, if applicable to the present invention, should also be included within the protection scope of the present invention, and will be incorporated here by reference.

Referring to FIG. 1, in step S001, when a user accesses a webpage, a page generating apparatus determines a set of keywords that includes at least one keyword from among one or more to-be-exhibited keywords.

The set of keywords includes one or more user keywords corresponding to the user.

The method further comprises step S100 (not shown).

In step S100, the page generating apparatus obtains one or more to-be-exhibited keywords.

Specifically, the page generating apparatus analyzes network usage records of the user, to determine one or more user keywords corresponding to the user.

The at least one to-be-exhibited keyword comprises one or more user keywords corresponding to the user.

The network usage records include, but are not limited to, any one of the following:
1) historical browsing records of the user within a predetermined time period; e.g., webpage address information of one or more search result pages obtained and browsed by the user through search engine query, and for another example, webpage content information stored by the user;
2) historical search records of the user within a predetermined time period; e.g., query words and the like used by the user when querying through one or more search engines within a predetermined time period;
3) preset information reflecting the user preference, e.g., the user's preset fields of interest, including "sports," "movies," and the like; for another example, relevant information of a website subscribed by the user, etc.

The methods in which the webpage generating apparatus analyzes the network usage records of the user to determine one or more user keywords corresponding to the user include, but are not limited to, any one of the following methods:
1) based on the historical search records of the user within a predetermined period of time, using one or more query words used by the user within the predetermined period of time as the user keywords corresponding to the user;
2) determining one or more user keywords corresponding to the user based on the historical browsing records of the user within the predetermined period of time, wherein this manner specifically includes:
   i) determining address information of one or more webpages browsed by the user within the predetermined period of time, and extracting one or more words from the determined address information as the user keywords corresponding to the user; and
   ii) determining a webpage browsed by the user within the predetermined period of time, and performing textual analysis of the webpage browsed by the user so as to obtain one or more keywords corresponding to the webpage, to be used as the user keywords corresponding to the user, wherein the process of obtaining the keywords corresponding to the webpage related to the historical browsing records is identical or similar to the subsequent process in which the page generating apparatus analyzes the webpage currently accessed by the user to obtain the webpage keywords corresponding to the webpage, which will be described in detail infra, and is thus not detailed here;
3) determining one or more user keywords corresponding to the user based on preset information reflecting the user's interests, wherein this manner specifically includes:
   i) using the words contained in the information as the user keywords corresponding to the user; and
   ii) based on a webpage frame structure of the webpage, using the words extracted in the corresponding webpage content information as the webpage keywords. For example, the page generating apparatus uses the words extracted from the position of the webpage title as the webpage keywords of the webpage.

Preferably, the page generating apparatus obtains privacy access rights corresponding to the user, and determines whether respective network usage records are accessible based on the privacy access rights, so as to obtain the corresponding user keywords based on the accessible network usage records.

For example, when the page generating apparatus accesses webpage address information browsed by the use and stored in the cookies, it first sends "whether to allow access to the cookies" prompt information to the user; when receiving the "allow" command selected by the user, it accesses the user's cookies to obtain corresponding network address information. For another example, when the page generating apparatus accesses the webpage address information browsed by the use and stored in the cookies and the query word information used by the user, the page generating apparatus obtains that the privacy levels pre-set by the user for the webpage address information and the query word information are "high" and "low" respectively (wherein "high" is for indicating the information which is desired by the user not to be obtained), and then the page generating apparatus accesses the cookies to obtain the corresponding query word information based on the privacy level information, without obtaining the webpage address information.

Preferably, the keyword set further includes one or more webpage keywords corresponding to the webpage. The page generating apparatus analyzes the webpage to obtain the webpage keywords corresponding to the webpage.

The manner in which the page generating apparatus obtains the webpage keywords corresponding to the webpage includes, but is not limited to, any one of the following:
1) using the words extracted from the content information in the predetermined webpage structure as the webpage keywords. For example, the page generating apparatus will use the words extracted in the webpage title as the webpage keywords of the webpage;
2) obtaining the text content information of the webpage, and performing textual analysis on the textual content information, thereby obtaining the webpage keywords corresponding to the webpage.

Preferably, statistics are collected based on the words in the textual content information of the webpage to obtain statistical information related to the words in the textual content information, and the important words in the webpage based on the statistical results are used as the webpage keywords. For example, statistics are collected on the textual contents of the webpage through TF-IDF (term frequency-inverse document frequency), to determine the webpage keywords of the webpage. For another example, the webpage keywords are determined by collecting statistics on the lengths of the words, the context, the types of the keywords, and other semantic features of the words. More preferably, the page generating apparatus selects one or more keywords with the highest search frequency as the webpage keywords from among a plurality of keywords corresponding to the obtained textual content information.

Preferably, the keyword set further includes one or more hot keywords, and the page generating apparatus obtains the query-related information from the search engine and determines one or more hot keywords based on the query-related information.

The query-related information includes, but is not limited to:
1) a plurality of keywords received by the search engine within a predetermined time; and
2) resultant webpage information obtained by the search engine based on a part or all of the received query words.

Preferably, the page generating apparatus uses one or more pieces of query-related information with the highest search frequency in the search engine as the hot keywords.

It should be noted that, when the user accesses a webpage, the page generating apparatus may simultaneously obtain the user keywords corresponding to the user, the webpage keywords corresponding to the webpage, and the hot keywords, in order to exhibit them to the user.

According to a first example of the present invention, the network usage records of user "A" obtained by the page generating apparatus includes the webpage content information browsed by user "A" within the recent one week, and a plurality of query words "water purifier" and "mini-games" used by user "A" when performing query with a search engine within the week. Next, the page generating apparatus uses the plurality of query words as the user keywords corresponding to the user "A"; moreover, obtains the user keywords "English learning" and "basketball news" from the address information of a plurality of web pages browsed by the user "A"; then, the page generating apparatus obtains four user keywords in total: "water purifier," "mini-game," "English learning" and "basketball news." Moreover, the page generating apparatus using the query words "regimen" and "lost weight" with the highest search frequencies in a search engine as the hot keyword. Then when the user "A" accesses a webpage Page_1, the page generating apparatus obtains the textual content information of the webpage Page_1, and calculates the weight values of the words based on the TF-IDF algorithm, resulting in the first three words with the highest weight values: "second-hand vehicles," "second-hand vehicle transactions," and "second-hand vehicle market." Next, the page generating apparatus selects "second-hand vehicles" with the highest search frequency therein as the webpage keyword corresponding to the webpage Page_1.

It should be noted that the above example is only for better illustrating the technical solution of the present invention, rather than limiting the present invention. Those skilled in the art should understand that any implementation manner of obtaining one or more to-be-exhibited keywords should be included within the scope of the present invention.

The manner in which the page generating apparatus determines at least one keyword from among one or more to-be-exhibited keywords includes, but is not limited to, at least any one of the following:
1) the page generating apparatus randomly selects at least one keyword from among one or more to-be-exhibited keywords.
2) the page generating apparatus selects in priority the user keywords from one or more to-be-exhibited keywords; if the number of user keywords does not reach a predetermined number threshold, it continues to randomly select the remaining keywords that need to be exhibited from the webpage keywords and the hot keywords.
3) the page generating apparatus obtains the category information of the webpage, and selects one or more keywords from among the one or more to-be-exhibited keywords based on the category information of the webpage.

Specifically, the page generating apparatus determines respective exhibition priorities of at least one keyword based on the category information of the webpage, so as to select one or more keywords from among the at least one keyword, to be exhibited in the webpage.

Preferably, the page generating apparatus obtains category relevant information of the webpage, so as to determine the category information of the webpage base on the category relevant information, wherein, the category relevant information including a variety of information, relevant to the webpage, used for determining the category of the webpage, for example, code information of the webpage, for another example, the textual content information of the webpage, etc.

More preferably, the category information of the webpage includes at least any one of the following:
1) textual category, e.g., using the webpage having a predetermined text body structure in the webpage code as the webpage of a textual category; for another example, counting the word number of the text in the webpage, and identifying the webpage whose word number reaches a certain threshold as the webpage of textual category; and
2) multimedia category, e.g., using the webpage containing multimedia files such as pictures, audios and videos, whose quantity exceeds a threshold as the webpage of multimedia category.

More preferably, a webpage may belong to both a textual category and a multimedia category. Preferably, for the webpage of a textual category, the page generating apparatus determines that the priority of the webpage keywords is higher than that of the user keywords; for the webpage of a multimedia category, the page generating apparatus determines that the priority of the user keywords is higher than that of the webpage keywords.

Preferably, when the priority of the webpage keywords is higher than that of the user keywords, the page generating apparatus would still select a part of user keywords to exhibit to the user.

It should be noted that there is no timing order between step S001 and step S100; the page generating apparatus may first perform step S001 and then step S100; or first performs step S100 and then step S001; or performs step S001 and step S100 simultaneously. Preferably, the page generating apparatus may first perform partially the step S100 and then perform step S001. For example, first perform the operation of obtaining user keywords and hot keywords in step S100, and then when step S001 starts being performed, based on the webpage that needs to be accessed by the user in step S001, continue performing the operation of obtaining the webpage keywords of the webpage in step S100.

A webpage may be categories into a textual webpage and a multimedia webpage, and the predetermined number of keywords that need to be exhibited is five. The to-be-exhibited keywords obtained by the page generating apparatus include user keywords "water purifier," "mini-game," "English learning" and "basketball news," hot keywords "regimen" and "lost weight," and a webpage keyword "second-hand vehicle"; moreover, the page generating module obtains the webpage code information of the webpage Page_1, and knows that the content of the webpage Page_1 containing only words based on the code information, then the page generating apparatus determines that the webpage Page_1 is a textual category webpage. Then, the page generating apparatus selects in priority the webpage keyword "second-hand vehicle," and randomly selects the latter four keywords for exhibition, which are "water purifier," "mini-game," "regimen" and "basketball news," from among the remaining user keywords: "water purifier," "mini-game," "English learning", "basketball news", and hot keywords: "regimen", "lost weight".

It should be noted that, the above example is only for better illustration of the technical solution of the present invention, rather than limiting the present invention. Any implementation manner of determining respective exhibition priorities of the at least one keyword based on the category information of the webpage, so as to select one or more keywords, should be included within the protection scope of the present invention.

Next, in step S002, the page generating apparatus exhibits, in the accessed webpage, the at least one keyword.

Specifically, the page generating apparatus generates a webpage containing the at least one keyword based on a predetermined keyword exhibition pattern and the original webpage information of the accessed webpage, so as to be exhibited to the user.

The page generating apparatus determines, in step S001, that the 5 keywords for exhibition include "second-hand vehicles," "water purifier," "mini-game," "regimen" and "basketball news." Then, the page generating apparatus adds, in the original webpage code of the webpage Page_1, the codes of links corresponding to the above 5 keywords for exhibition at the bottom of the page based on original webpage code of the webpage Page_1 and the predetermined link exhibition format, thereby obtaining the new webpage Page_1 which contains the links of the 5 keywords and exhibiting it to the user.

It should be noted that the above examples are only for better illustrating the technical solution of the present invention, not intended to limit the present invention. Those skilled in the art should understand that any implementation manner of exhibiting the at least one keyword in the accessed webpage should be included within the scope of the present invention.

Next, in step S003, the page generating apparatus obtains the user's selection operation on said at least one keyword, so as to determine the chosen keyword(s) selected by the user based on the user's selection operation.

For example, the page generating apparatus uses the keywords clicked onto by the user in the webpage exhibiting the keywords as the chosen keywords. For another example, the page generating apparatus obtains the hovering operation of the user performed over the keywords in the webpage exhibiting keywords using a mouse, and selects the keywords over which the hovering time of the mouse exceeds a predetermined time length.

Next, in step S004, the page generating apparatus generates a recommendation page corresponding to the chosen keyword(s) so as to exhibit it to the user.

The recommendation page includes at least one piece of keyword recommendation information associated with the chosen keyword(s). Preferably, the keyword recommendation information contains advertising information related to the keyword(s).

The method further comprises step S005 (not shown), and the step S004 further comprises step S0041 (not shown).

In step S005, the page generating apparatus obtains at least one piece of recommendation information for the recommendation page.

Specifically, the page generating apparatus performs query based on the chosen keyword(s), so as to obtain at least one piece of recommendation information for the recommendation page.

Preferably, the page generating apparatus expands the chosen keyword(s). For example, use a keyword expanding tool to expand the alternative keyword into a plurality of keywords relevant to the alternative keyword. Next, the page generating apparatus performs query based on the expansion result of the chosen keyword(s), and using the recommendation information corresponding to the expanding result as the keyword recommendation information.

Next, in step S0041, the page generating apparatus generates a recommendation page corresponding to the chosen keyword(s) based on the predetermined recommendation page pattern and the obtained at least one piece of recommendation information, wherein the at least one recommendation information includes at least one piece of keyword recommendation information associated with the chosen keyword(s).

The page generating apparatus obtains, in step S003, that the user "A" clicks onto the link of the keyword "second-hand vehicles" on Page_1 exhibiting the keywords; then, the page generating apparatus uses the "second-hand vehicles" as the chosen keyword. Next, the page generating apparatus obtains that the expending result of "second-hand vehicle" containing "second-hand vehicles" and "vehicle". Then the page generating apparatus queries "second-hand vehicles" and "vehicle" in the search engine, resulting in 10 pieces of advertising information corresponding to "second-hand vehicles" and 20 pieces of advertising information corresponding to "vehicle" as the keyword recommendation information. Next, the page generating apparatus generates a recommendation page based on the predetermined recommendation page template and the resulting 30 pieces of advertising information.

It should be noted that the above examples are only for better illustrating the technical solution of the present invention, rather than limiting the present invention. Those skilled in the art should understand that any implementation manner of performing query based on the chosen keyword(s) to obtain at least one piece of keyword recommendation information and generating the recommendation page based on the at least one piece of keyword recommendation information.

Preferably, the at least one piece of recommendation information further includes at least one piece of user recommendation information associated with the user. The method further comprises step S006 (not shown), and the step S004 further comprises a step S0042 (not shown).

In step S006, the page generating apparatus analyzes the network usage records of the user to determine at least one piece of user recommendation information corresponding to the user.

The manner, in which the page generating apparatus analyzes the network usage records of the user to determine at least one piece of user recommendation information corresponding to the user, includes, but is not limited to, any one of the following:

1) the page generating apparatus obtains historical search records of the user within a predetermined period of time, and then, performs query based on one or more query words used by the user within a predetermined period of time, and uses the relevant recommendation information as the user recommendation information corresponding to the user.

2) the page generating apparatus determines at least one piece of user recommendation information corresponding to the user based on the historical browsing record(s) of the user within a predetermined time period, wherein the manner specifically includes:

i) the page generating apparatus obtains the address information of one or more webpages browsed by the user within a predetermined period of time; next, performs query based on the address information, and uses the corresponding recommendation information as the user recommendation information corresponding to the user.

ii) the page generating apparatus obtains the content of the webpage browsed by the user within a predetermined period of time and analyzes the webpage currently accessed by the user, so as to obtain one or more topic words corresponding to the webpage in a manner that is identical or similar to the manner of obtaining webpage keywords corresponding to the webpage. Next, the page generating apparatus performs query based on the one or more topic words, and uses the corresponding recommendation information as the user recommendation information corresponding to the user.

3) the page generating apparatus determines at least one piece of user recommendation information corresponding to the user based on the preset information indicating the user interests, wherein this manner specifically includes:

i) the page generating apparatus performs query based on the preset information, and uses the corresponding recommendation information as the user recommendation information corresponding to the user;

ii) the page generating apparatus obtains webpage(s) associated with the preset information based on the preset information, and through analysis of the current accessed webpage performed by the page generating apparatus, obtains one or more topic words corresponding to the relevant webpage in a manner identical or similar to the manner of obtaining webpage keyword(s) corresponding to the webpage, next, the page generating apparatus performs query based on the one or more topic words, and uses the corresponding recommendation information as the user recommendation information corresponding to the user.

Preferably, the page generating apparatus obtains privacy access rights corresponding to the user, and decides whether respective network usage records are accessible based on the privacy access rights, so as to obtain the corresponding user recommendation information based on the accessible network usage records.

Next, in step S0042, the page generating apparatus generates the recommendation page based on the at least one piece of keyword recommendation information and the determined at least one piece of user recommendation information, so as to exhibit the recommendation page to the user.

The page generating apparatus obtains that the query words ever used by user "A" within a half month include "water purifier" and "mini-games," then the page generating apparatus queries the "water purifier" and "mini-games" in the search engine, resulting in sixteen pieces of advertising information corresponding to the "water purifier" and "mini-games" as the user recommendation information corresponding to user "A". Next, the page generating apparatus generates a recommendation page based on the obtained 30 pieces of advertising information corresponding to "second-hand vehicles" and "vehicle" and sixteen pieces of advertising information corresponding to the "water purifier" and "mini-game," to exhibit the forty-six pieces of advertising information to the user "A".

It should be noted that the above example is only for better illustrating the technical solution of the present invention, rather than limiting the present invention. Those skilled in the art should understand that any implementation manner of analyzing the network usage records of the user to determine at least one piece of user recommendation information corresponding to the user and generating the recommendation page based on the at least one piece of keyword recommendation information and the determined at least one piece of user recommendation information should fall within the scope of the present invention.

Preferably, the at least one piece of recommendation information further comprises at least one piece of hot recommendation information, and the page generating apparatus further obtains one or more pieces of hot recommendation information from the search engine; moreover, the page generating apparatus generates the recommendation page based on the at least one piece of keyword recommendation information and the determined at least one piece of hot recommendation information, so as to exhibit the recommendation page to the user.

The manner in which the page generating apparatus obtains one or more pieces of hot recommendation information from the search engine includes, but is not limited to, any one of the following:

1) the page generating apparatus first obtains one or more hot keywords from the search engine, and performs further search based on the hot keywords, so as to obtain hot recommendation information corresponding to respective hot keywords;

The manner in which the page generating apparatus obtains the hot keyword(s) is identical or similar to the above step S100, which will therefore not be detailed.

2) the page generating apparatus uses one or more webpages which are most-searched in the search engine as the hot recommendation information.

The hot keywords obtained by the page generating apparatus further comprises "education" and "kids"; then the page generating apparatus queries "education" and "kids" in the search engine, obtaining fourteen pieces of advertising information corresponding to "education" and "kids" as the hot recommendation information. Next, the page generating apparatus generates a recommendation page based on the resulting 30 advertising information associated with "second-hand vehicles" and "vehicle" and 14 advertising information associated with "education" and "kids" to generate a recommendation page so as to exhibit the 44 pieces of advertising information to user "A".

According to the solution of the present invention, by analyzing the network usage records and the accessed webpage of the user, in conjunction with the hot information in the search engine, keywords indicating user interests, indicating the webpage content, and indicating hot content are obtained so as to exhibit the determined keyword(s) for the user in the webpage, such that the user can look up keywords from a plurality of sources in the accessible page, thereby enhancing the possibility for the user to find the keywords of his/her most interest, which improves the accuracy of keyword recommendation; based on the keywords selected by the user and in conjunction with the network usage records of the user and the hot information in the search engine, recommendation information associated with the keywords that selected by user and the recommendation information associated with user interests and hot information are obtained, so as to exhibit the obtained recommendation information in the generated recommendation page, such that after the user clicks onto the link of the keywords, the recommendation information associated with the chosen keywords and the recommendation information associated with the user interests and hot information may be exhibited thereto, such that the content of the recommendation information is richer.

FIG. 2 schematically shows a structural diagram of a page generating apparatus for generating a recommendation page according to the present invention. The page generating apparatus according to the present invention comprises a first determining device 001, an exhibiting device 002, a first obtaining device 003, and a generating device 004.

Referring now to FIG. 2, when a user accesses a webpage, the first determining device 001 determines at least one keyword from among one or more to-be-exhibited keywords.

The at least one keyword includes one or more user keywords corresponding to the user.

The first determining device 001 further comprises a second obtaining device (not shown), and the second obtaining device further comprises a first analyzing device (not shown).

The second obtaining device obtains one or more to-be-exhibited keywords.

Specifically, the first analyzing device analyzes network usage records of the user, to determine one or more user keywords corresponding to the user.

The at least one to-be-exhibited keyword comprises one or more user keywords corresponding to the user.

The network usage records include, but is not limited to, any one of the following:

1) historical browsing records of the user within a predetermined time period; e.g., webpage address information of one or more search result pages obtained and browsed by the user through search engine query, and for another example, webpage content information stored by the user;

2) historical search records of the user within a predetermined time period; e.g., query words and the like used by the user when querying through one or more search engines within a predetermined time period;

3) preset information reflecting the user preference, e.g., the user presets the fields of his/her interest, including "sports," "movies," and the like; for another example, relevant information of a website subscribed by the user, etc.

The methods by which the first analyzing device analyzes the network usage records of the user to determine one or more user keywords corresponding to the user include, but is not limited to, any one of the following methods:

1) based on the historical search records of the user within a predetermined period of time, using one or more query words used by the user within the predetermined period of time as the user keywords corresponding to the user;

2) determining one or more user keywords corresponding to the user based on the historical browsing records of the user within the predetermined period of time, wherein this method specifically includes:

i) determining address information of one or more webpages browsed by the user within the predetermined period of time, and extracting one or more words from the determined address information as the user keywords corresponding to the user;

ii) determining a webpage browsed by the user within the predetermined period of time, and performing textual analysis of the webpage browsed by the user so as to obtain one or more keywords corresponding to the webpage, to be used as the user keywords corresponding to the user, wherein the process of obtaining the keywords corresponding to the webpage related to the historical browsing records is identical or similar to the subsequent process in which a second analyzing device (not shown) analyzes the webpage currently accessed by the user to obtain the webpage keywords corresponding to the webpage, which will be described in detail infra, and is thus not detailed here;

3) determining one or more user keywords corresponding to the user based on preset information reflecting the user's interests, wherein this method specifically includes:

i) using the words contained in the information as the user keywords corresponding to the user;

ii) based on a webpage frame structure of the webpage, using the words extracted in the corresponding webpage content information as the webpage keywords. For example, the first analyzing device uses the words extracted from the position of the webpage title as the webpage keywords of the webpage.

Preferably, the first analyzing device obtains privacy access rights corresponding to the user, and determines whether respective network usage records are accessible based on the privacy access rights, so as to obtain the corresponding user keywords based on the accessible network usage records.

For example, when the first analyzing device accesses webpage address information browsed by the use and stored in the cookies, it first sends "whether to allow access to the cookies" prompt information to the user; when receiving the "allow" command selected by the user, it accesses the user's cookies to obtain corresponding network address information. For another example, when the first analyzing device accesses the webpage address information browsed by the use and stored in the cookies and the query word information used by the user, the page generating apparatus obtains that the privacy levels pre-set by the user for the webpage address information and the query word information are "high" and "low" respectively (wherein "high" is for indicating the information which is desired by the user not to be obtained), and then the page generating apparatus accesses the cookies to obtain the corresponding query word information based on the privacy level information, without obtaining the webpage address information.

Preferably, the second obtaining device further comprises the second analyzing device, the at least one keyword further includes one or more webpage keywords corresponding to the webpage; the second analyzing device analyzes the webpage to obtain the webpage keywords corresponding to the webpage.

The method by which the second analyzing device obtains the webpage keywords corresponding to the webpage includes, but is not limited to, any one of the following:

1) the second analyzing device uses the words extracted from the content information in the predetermined webpage structure as the webpage keywords. For example, the second analyzing device will use the words extracted in the webpage title as the webpage keywords of the webpage;

2) the second analyzing device obtains the text content information of the webpage, and performing textual analysis on the textual content information, thereby obtaining the webpage keywords corresponding to the webpage.

Preferably, statistics is made on the words in the textual content information of the webpage to obtain statistical information related to the words in the textual content information, and the important words in the webpage based on the statistical results are used as the webpage keywords. For example, statistics is made on the textual contents of the webpage through TF-IDF (term frequency-inverse document frequency), to determine the webpage keywords of the webpage. For another example, the webpage keywords are determined by making statistics on the lengths of the words, the context, the types of the keywords, and other semantic features of the words. More preferably, page generating apparatus selects one or more keywords with the highest search frequency as the webpage keywords from among a plurality of keywords corresponding to the obtained textual content information.

Preferably, the second obtaining device further comprises a query obtaining device (not shown), a second determining device (not shown). The at least one keyword further includes one or more hot keywords. Wherein, the query obtaining device obtains the query-related information from the search engine, and the second determining device determines one or more hot keywords based on the query-related information.

The query-related information includes, but is not limited to:

1) a plurality of keywords received by the search engine within a predetermined time;

2) a resultant webpage information obtained by the search engine based on a part or all of the received query words.

Preferably, the second determining device uses one or more pieces of query-related information with the highest search frequency in the search engine as the hot keywords.

It should be noted that, when the user accesses a webpage, the second obtaining device may simultaneously obtain the user keywords corresponding to the user, the webpage keywords corresponding to the webpage, and the hot keywords, in order to exhibit them to the user.

According to a first example of the present invention, the network usage records of user "A" obtained by the first analyzing device includes the webpage content information browsed by user "A" within the recent one week, and a plurality of query words "water purifier" and "mini-games" used by user "A" when performing query with a search engine within the week. Next, the first analyzing device uses the plurality of query words as the user keywords corresponding to the user "A"; moreover, obtains the user keywords "English learning" and "basketball news" from the address information of a plurality of web pages browsed by the user "A"; then, the first analyzing device obtains four user keywords in total: "water purifier," "mini-game," "English learning" and "basketball news." Moreover, the second determining device using the query words "regimen" and "lost weight" with the highest search frequencies in a search engine as the hot keyword. Then when the user "A" accesses a webpage Page_1, the second analyzing device obtains the textual content information of the webpage Page_1, and calculates the weight values of the words based on the TF-IDF algorithm, resulting in the first three words with the highest weight values: "second-hand vehicles," "second-hand vehicle transactions," and "second-hand vehicle market." Next, the second analyzing device selects "second-hand vehicles" with the highest search frequency therein as the webpage keyword corresponding to the webpage Page_1.

It should be noted that the above example is only for better illustrating the technical solution of the present invention, rather than limiting the present invention. Those skilled in the art should understand that any implementation method of obtaining one or more to-be-exhibited keywords should be included within the scope of the present invention.

The method by which the first determining device 001 determines at least one keyword from among one or more to-be-exhibited keywords includes, but is not limited to, at least any one of the following:

1) the first determining device 001 randomly selects at least one keyword from among one or more to-be-exhibited keywords.

2) the first determining device 001 selects in priority the user keywords from one or more to-be-exhibited keywords; if the number of user keywords does not reach a predetermined number threshold, it continues to randomly select the remaining keywords that need to be exhibited from the webpage keywords and the hot keywords.

3) the page generating apparatus according to present invention further comprises a category obtaining device (not shown), the first determining device 001 further comprise a selecting device (not shown). The category obtaining device obtains the category information of the webpage, and the selecting device selects one or more keywords from among the one or more to-be-exhibited keywords based on the category information of the webpage.

Specifically, the selecting device determines respective exhibition priorities of at least one keyword based on the category information of the webpage, so as to select one or more keywords from among the at least one keyword, to be exhibited in the webpage.

Preferably, the category obtaining device obtains category relevant information of the webpage, so as to determine the category information of the webpage base on the category relevant information, wherein, the category relevant information including a variety of information, relevant to the webpage, used for determining the category of the webpage, for example, code information of the webpage, for another example, the textual content information of the webpage, etc.

More preferably, the category information of the webpage includes at least any one of the following:

1) textual category, e.g., using the webpage having a predetermined text body structure in the webpage code as the webpage of a textual category; for another example, counting the word number of the text in the webpage, and identifying the webpage whose word number reaches a certain threshold as the webpage of textual category;

2) multimedia category, e.g., using the webpage containing multimedia files such as pictures, audios and videos, whose quantity exceeds a threshold as the webpage of multimedia category.

More preferably, a webpage may belong to both a textual category and a multimedia category. Preferably, for the webpage of a textual category, the selecting device determines that the priority of the webpage keywords is higher than that of the user keywords; for the webpage of a multimedia category, the selecting device determines that the priority of the user keywords is higher than that of the webpage keywords.

Preferably, when the priority of the webpage keywords is higher than that of the user keywords, the selecting device would still select a part of user keywords to exhibit to the user.

It should be noted that there is no timing order between the operation for the first determining device determines at least on keyword and the operation for the second obtaining device obtains one or more to-be-exhibited keywords; the operation for the first determining device determines at least on keyword could be performed first, or, the operation for the second obtaining device obtains one or more to-be-exhibited keywords, or both operation could be performed simultaneously. Preferably, the second obtaining device may first obtain part of the one or more to-be-exhibited keywords, and then the first determining device determines at least one keyword. For example, the second obtaining device first performs the operation of obtaining user keywords and hot keywords, and then when the first determining device starts being performed, based on the webpage that needs to be accessed by the user, the second obtaining device continues performing the operation of obtaining the webpage keywords of the webpage.

A webpage may be categorized into a textual webpage and a multimedia webpage, and the predetermined number of keywords that need to be exhibited is 5. The to-be-exhibited keywords obtained by the second obtaining device include user keywords "water purifier," "mini-game," "English learning" and "basketball news," hot keywords "regimen" and "lost weight," and a webpage keyword "second-hand vehicle"; moreover, the category obtaining device obtains the webpage code information of the webpage Page_1, and knows that the content of the webpage Page_1 containing only words based on the code information, then the category obtaining device determines that the webpage Page_1 is a textual category webpage. Then, the selecting device selects in priority the webpage keyword "second-hand vehicle," and randomly selects the latter four keywords for exhibition, which are "water purifier," "mini-game," "regimen" and "basketball news," from among the remaining user keywords: "water purifier," "mini-game," "English learning", "basketball news", and hot keywords: "regimen", "lost weight".

It should be noted that, the above example is only for better illustration of the technical solution of the present invention, rather than limiting the present invention. Those skilled in the art should understand that, any implementation method of determining respective exhibition priorities of the at least one keyword based on the category information of the webpage, so as to select one or more keywords, should be included within the protection scope of the present invention.

Next, the exhibiting device 002 exhibits, in the accessed webpage, the at least one keyword.

Specifically, the exhibiting device 002 generates a webpage containing the at least one keyword based on a predetermined keyword exhibition pattern and the original webpage information of the accessed webpage, so as to be exhibited to the user.

The first determining device 001 determines, in step S001, that the 5 keywords for exhibition include "second-hand vehicles," "water purifier," "mini-game," "regimen" and "basketball news." Then, the exhibiting device 002 adds, in the original webpage code of the webpage Page_1, the codes of links corresponding to the above 5 keywords for exhibition at the bottom of the page based on original webpage code of the webpage Page_1 and the predetermined link exhibition format, thereby obtaining the new webpage Page_1 which contains the links of the 5 keywords and exhibiting it to the user.

It should be noted that the above examples are only for better illustrating the technical solution of the present invention, not intended to limit the present invention. Those skilled in the art should understand that any implementation method of exhibiting the at least one keyword in the accessed webpage should be included within the scope of the present invention.

Next, the first obtaining device 003 obtains the user's selection operation on said at least one keyword, so as to determine the chosen keyword(s) selected by the user based on the user's selection operation.

For example, the first obtaining device 003 uses the keywords clicked onto by the user in the webpage exhibiting the keywords as the chosen keywords. For another example, the first obtaining device 003 obtains the hovering operation of the user performed over the keywords in the webpage exhibiting keywords using a mouse, and selects the keywords over which the hovering time of the mouse exceeds a predetermined time length.

Next, the generating device 004 generates a recommendation page corresponding to the chosen keyword(s) so as to exhibit it to the user.

The recommendation page includes at least one piece of keyword recommendation information associated with the chosen keyword(s). Preferably, the keyword recommendation information contains advertising information related to the keyword(s).

The page generating apparatus further comprises a information obtaining device (not shown).

The information obtaining device obtains at least one piece of recommendation information for the recommendation page. The information obtaining device further comprises a querying device (not shown).

Specifically, the querying device performs query based on the chosen keyword(s), so as to obtain at least one piece of recommendation information for the recommendation page.

Preferably, the page generating apparatus expands the chosen keyword(s). For example, use a keyword expanding tool to expand the alternative keyword into a plurality of keywords relevant to the alternative keyword. Next, the querying device performs query based on the expansion result of the chosen keyword(s), and using the recommendation information corresponding to the expanding result as the keyword recommendation information.

Next, the generating device 004 generates a recommendation page corresponding to the chosen keyword(s) based on the predetermined recommendation page pattern and the obtained at least one piece of recommendation information, wherein the at least one recommendation information includes at least one piece of keyword recommendation information associated with the chosen keyword(s).

The first obtaining device 003 obtains, in step S003, that the user "A" clicks onto the link of the keyword "second-hand vehicles" on Page_1 exhibiting the keywords; then, the page generating apparatus uses the "second-hand vehicles" as the chosen keyword. Next, the page generating apparatus obtains that the expending result of "second-hand vehicle" containing "second-hand vehicles" and "vehicle". Then the querying device queries "second-hand vehicles" and "vehicle" in the search engine, resulting in 10 pieces of advertising information corresponding to "second-hand vehicles" and 20 pieces of advertising information corresponding to "vehicle" as the keyword recommendation information. Next, the generating device 004 generates a recommendation page based on the predetermined recommendation page template and the resulting 30 pieces of advertising information.

It should be noted that the above examples are only for better illustrating the technical solution of the present invention, rather than limiting the present invention. Those skilled in the art should understand that any implementation method of performing query based on the chosen keyword(s) to obtain at least one piece of keyword recommendation information and generating the recommendation page based on the at least one piece of keyword recommendation information.

Preferably, the at least one piece of recommendation information further includes at least one piece of user recommendation information associated with the user. The information obtaining device further comprises a third analyzing device (not shown).

The third analyzing device analyzes the network usage records of the user to determine at least one piece of user recommendation information corresponding to the user.

The method in which the third analyzing device analyzes the network usage records of the user to determine at least one piece of user recommendation information corresponding to the user, includes, but is not limited to, any one of the following:

1) the third analyzing device obtains historical search records of the user within a predetermined period of time, and then, performs query based on one or more query words used by the user within a predetermined period of time, and uses the relevant recommendation information as the user recommendation information corresponding to the user.

2) the third analyzing device determines at least one piece of user recommendation information corresponding to the user based on the historical browsing record(s) of the user within a predetermined time period, wherein the method specifically includes:

i) the third analyzing device obtains the address information of one or more webpages browsed by the user within a predetermined period of time; next, performs query based on the address information, and uses the corresponding recommendation information as the user recommendation information corresponding to the user.

ii) the third analyzing device obtains the content of the webpage browsed by the user within a predetermined period of time, and through analyzing the webpage currently accessed by the user by the second analyzing device, so as to obtain one or more topic words corresponding to the webpage in a manner that is identical or similar to the manner of obtaining webpage keywords corresponding to the webpage. Next, the third analyzing device performs query based on the one or more topic words, and uses the corresponding recommendation information as the user recommendation information corresponding to the user.

3) the third analyzing device determines at least one piece of user recommendation information corresponding to the user based on the preset information indicating the user interests, wherein this method specifically includes:

i) the third analyzing device performs query based on the preset information, and uses the corresponding recommendation information as the user recommendation information corresponding to the user;

ii) the third analyzing device obtains webpage(s) associated with the preset information based on the preset information, and through analyzing of the current accessed webpage performed by the second analyzing device, obtains one or more topic words corresponding to the relevant webpage in a manner identical or similar to the manner of obtaining webpage keyword(s) corresponding to the webpage, next, the third analyzing device performs query based on the one or more topic words, and uses the corresponding recommendation information as the user recommendation information corresponding to the user.

Preferably, the third analyzing device obtains privacy access rights corresponding to the user, and decides whether respective network usage records are accessible based on the privacy access rights, so as to obtain the corresponding user recommendation information based on the accessible network usage records.

Next, the generating device 004 generates the recommendation page based on the at least one piece of keyword recommendation information and the determined at least one piece of user recommendation information, so as to exhibit the recommendation page to the user.

The third analyzing device obtains that the query words ever used by user "A" within a half month include "water purifier" and "mini-games," then the page generating apparatus queries the "water purifier" and "mini-games" in the search engine, resulting in 16 pieces of advertising information corresponding to the "water purifier" and "mini-games" as the user recommendation information corresponding to user "A". Next, the generating device 004 generates a recommendation page based on the obtained 30 pieces of advertising information corresponding to "second-hand vehicles" and "vehicle" and 16 pieces of advertising information corresponding to the "water purifier" and "mini-game," to exhibit the 46 pieces of advertising information to the user "A".

It should be noted that the above example is only for better illustrating the technical solution of the present invention, rather than limiting the present invention. Those skilled in the art should understand that any implementation method of analyzing the network usage records of the user to determine at least one piece of user recommendation information corresponding to the user and generating the recommendation page based on the at least one piece of keyword recommendation information and the determined at least one piece of user recommendation information should fall within the scope of the present invention.

Preferably, the at least one piece of recommendation information further comprises at least one piece of hot recommendation information, and the page generating apparatus further obtains one or more pieces of hot recommendation information from the search engine; moreover, the page generating apparatus generates the recommendation page based on the at least one piece of keyword recommendation information and the determined at least one piece of hot recommendation information, so as to exhibit the recommendation page to the user.

The method by which the page generating apparatus obtains one or more pieces of hot recommendation information from the search engine includes, but is not limited to, any one of the following:

1) the page generating apparatus first obtains one or more hot keywords from the search engine, and performs further search based on the hot keywords, so as to obtain hot recommendation information corresponding to respective hot keywords;

The method by which the page generating apparatus obtains the hot keyword(s) is identical or similar to the method by which the second determining device obtains the hot keyword(s) above, which will therefore not be detailed.

2) the page generating apparatus uses one or more webpages which are most-searched in the search engine as the hot recommendation information.

The hot keywords obtained by the page generating apparatus further comprises "education" and "kids"; then the page generating apparatus queries "education" and "kids" in the search engine, obtaining 14 pieces of advertising information corresponding to "education" and "kids" as the hot recommendation information. Next, the generating device 004 generates a recommendation page based on the resulting 30 advertising information associated with "second-hand vehicles" and "vehicle" and 14 advertising information associated with "education" and "kids" to generate a recommendation page so as to exhibit the 44 pieces of advertising information to user "A".

According to the solution of the present invention, by analyzing the network usage records and the accessed webpage of the user, in conjunction with the hot information in the search engine, keywords indicating user interests, indicating the webpage content, and indicating hot content are obtained so as to exhibit the determined keyword(s) for the user in the webpage, such that the user can look up keywords from a plurality of sources in the accessible page, thereby enhancing the possibility for the user to find the keywords of his/her most interest, which improves the accuracy of keyword recommendation; based on the keywords selected by the user and in conjunction with the network usage records of the user and the hot information in the search engine, recommendation information associated with the user chosen keywords and the recommendation information associated with user interests and hot information are obtained, so as to exhibit the obtained recommendation information in the generated recommendation page, such that after the user clicks onto the link of the keywords, the recommendation information associated with the chosen keywords and the recommendation information associated with the user interests and hot information may be exhibited thereto, such that the content of the recommendation information is richer.

The software program of the present invention may perform the above steps or functions through execution by the processor. Likewise, the software program of the present invention (including the relevant data structure) may be stored in a computer-readable recording medium, e.g., RAM memory, magnetic or optical driver or soft floppy or a similar device. Additionally, some steps or functions of the present invention may be implemented using hardware, e.g., as a circuit cooperating with the processor to perform various functions or steps.

Additionally, a part of the present invention may be applied as a computer program product, e.g., a computer program instruction, which, when being executed by the computer, may invoke or provide a method and/or technical solution according to the present invention through operations of the computer. Further, the program instruction invoking the method of the present invention may be stored in a fixed or mobile recording medium, and/or transmitted through broadcast or data flow in other signal carrier medium, an/or stored in a work memory of a computer device operating based on the program instructions. Here, when the computer program instruction is executed by the processor, the apparatus is triggered to operate the method and/or technical solution according to a plurality of embodiments of the present invention.

The invention claimed is:

1. A computer-implemented method for providing recommendations on a computer comprising a processor, said method comprising generating, using the processor, a recommendation page, wherein said generating a recommendation page comprises:
determining, using the processor, when a user accesses a webpage through the computer, at least one keyword from among one or more to-be-exhibited keywords, wherein said at least one keyword includes one or more user keywords corresponding to said user, said one or more user keywords are determined through analysis of network usage records of said user, wherein said at least one keyword also includes one or more hot keywords, and said one or more hot keywords correspond to one or more pieces of query-related information with a highest search frequency in a search engine, wherein said at least one keyword includes a webpage keyword selected from words which are obtained from textual content information of the accessed webpage;
displaying said at least one keyword in said accessed webpage;
obtaining, using the processor, a user's selection on said at least one keyword so as to determine chosen keywords selected by said user based on said user's selection;
generating, using the processor, a recommendation page corresponding to said chosen keywords so as to display to said user, wherein said recommendation page contains at least one piece of keyword recommendation information associated with said chosen keywords; and
displaying the recommendation page,
wherein the determining, using the processor, when the user accesses the webpage through the computer, a key word set from among one or more to-be-exhibited keywords comprises:
identifying a category of the accessed webpage based on category information of the accessed webpage, and determining the said at least one keyword based on the category information of the accessed webpage, wherein the category information of the accessed webpage comprises a textual category and a multimedia category, wherein if the accessed webpage has a predetermined text body structure in the webpage code or a word number of a text in the accessed webpage reaches a certain threshold, the accessed webpage is identified as the textual category, and the webpage keyword is determined as the said at least one keyword in priority, wherein if the accessed webpage contains pictures, audios or videos whose quantity exceeds a threshold, the accessed webpage is identified as the multimedia category, and the user keyword is determined as the said at least one key word in priority.

2. The method of claim 1, wherein said step of displaying said at least one keyword comprises:
generating a webpage containing said at least one keyword based on a predetermined keyword exhibition style and original webpage information of said accessed webpage so as to display said webpage to said user.

3. The method of claim 1, further comprising:
obtaining one or more to-be-exhibited keywords.

4. The method of claim 3, wherein said step of obtaining one or more to-be-exhibited keywords comprises:
analyzing said webpage to obtain at least one webpage keyword corresponding to said webpage.

5. The method of claim 3, wherein said step of determining at least one keyword further comprises:
obtaining the query-related information from said search engine, and
determining one or more hot keywords based on said query related information.

6. The method of claim 1, further comprising:
obtaining at least one piece of recommendation information for said recommendation page, wherein said step of generating a recommendation page further comprises:
generating a recommendation page based on predetermined style information of a recommendation page and at least said obtained piece of recommendation information, wherein said piece of recommendation information includes a piece of keyword recommendation information associated with said chosen keyword.

7. The method of claim 6, wherein said at least one piece of recommendation information comprises at least one piece of user recommendation information associated with said user, wherein said step of obtaining at least one piece of recommendation information further comprises:
analyzing network usage records of said user so as to determine a piece of user recommendation information corresponding to said user, wherein said step of generating a recommendation page further comprises:
generating said recommendation page based on said at least one piece of keyword recommendation information and said at least one piece of user recommendation information determined so as to display said recommendation page to said user.

8. A non-transitory computer readable storage medium, said non-transitory computer readable storage medium contains computer code, the method according to claim 1 is completed when said computer code is executed.

9. A computer program product, the method according to claim 1 is completed when said computer program product is executed.

10. A computer apparatus comprising storage and processor, said storage storing computer code, and said processor is configured to execute said computer code to implement the method according to claim 1.

11. An apparatus for providing recommendations to a user, said apparatus comprising a page generating apparatus for generating a recommendation page, wherein said page generating apparatus comprises:
a processor; and
a memory storing instructions, which when executed by the processor, cause the processor to perform operations, the operations comprising:
determining, when a user accesses a webpage through the computer, a keyword set from one or more to-be-exhibited keywords, wherein said keyword set includes one or more user keywords corresponding to said user, said one or more user keywords are determined through analysis of network usage records of said user, wherein said keyword set also includes one or more hot keywords, and said one or more hot keywords correspond to one or more pieces of query-related information with a highest search frequency in a search engine, wherein said keyword set includes a webpage keyword selected from words which are obtained from textual content information of the accessed webpage;
displaying said keyword set in said accessed webpage;
obtaining a user's selection operation on said keyword set so as to determine chosen keywords selected by said user based on said user's selection operation; and
generating a recommendation page corresponding to said chosen keywords for exhibit to said user, wherein said recommendation page contains keyword recommendation information associated with said chosen keywords; and
displaying the recommendation page,
wherein the determining, using the processor, when the user accesses the webpage through the computer, the keyword set from one or more to-be-exhibited keywords comprises:
identifying a category of the accessed webpage based on category information of the accessed webpage, and determining said key word set based on the category information of the accessed webpage, wherein the category information of the accessed webpage comprises a textual category and a multimedia category, wherein if the accessed webpage has a predetermined text body structure in the webpage code or a word number of a text in the accessed webpage reaches a certain threshold, the accessed webpage is identified as the textual category, and the webpage keyword is determined in priority as a keyword included in said keyword set, wherein if the accessed webpage contains pictures, audios or videos whose quantity exceeds a threshold, the accessed webpage is identified as the multimedia category, and the user keyword is determined in priority as a keyword included in said keyword set.

12. The apparatus of claim 11, wherein said displaying said at least one keyword comprises: generating a webpage containing said keyword set based on a predetermined keyword exhibition style and original webpage information of said accessed webpage so as to display said webpage to said user.

13. The apparatus of claim 11, wherein the operations further comprise:
obtaining one or more to-be-exhibited keywords.

14. The apparatus of claim 13, wherein said obtaining one or more to-be-exhibited keywords comprises:
analyzing said webpage to obtain a webpage keyword corresponding to said webpage.

15. The apparatus of claim 13, wherein said determining at least one keyword comprises:
obtaining the query-related information from said search engine; and
determining one or more hot keywords based on said query related information.

16. The apparatus of claim 11, wherein the operations further comprise:
obtaining at least one piece of recommendation information for said recommendation page;
wherein the generating a recommendation page further comprises:
generating a recommendation page based on predetermined style information of recommendation page and at least said obtained piece of recommendation information, wherein said piece of recommendation information includes keyword recommendation information associated with said chosen keywords.

17. The apparatus of claim 16, wherein said at least one piece of recommendation information further comprises at least one piece of user recommendation information associated with said user, wherein the obtaining at least one piece of recommendation information further comprises:

analyzing network usage records of said user so as to determine user recommendation information corresponding to said user;

wherein the generating a recommendation page further comprises:

generating said recommendation page based on said at least one piece of keyword recommendation information and said at least one piece of user recommendation information determined so as to exhibit said recommendation page to said user.

\* \* \* \* \*